(12) United States Patent
Lev

(10) Patent No.: US 12,367,607 B2
(45) Date of Patent: Jul. 22, 2025

(54) AUTONOMOUS VEHICLE CONTROL

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 409 days.

(21) Appl. No.: 17/367,654

(22) Filed: Jul. 6, 2021

(65) Prior Publication Data
US 2023/0009691 A1    Jan. 12, 2023

(51) Int. Cl.
*G06T 7/73* (2017.01)
*B60W 60/00* (2020.01)
*G06T 7/246* (2017.01)

(52) U.S. Cl.
CPC ............ *G06T 7/73* (2017.01); *B60W 60/001* (2020.02); *G06T 7/246* (2017.01); *B60W 2420/403* (2013.01); *B60W 2520/10* (2013.01); *B60W 2520/12* (2013.01); *B60W 2520/16* (2013.01); *B60W 2552/50* (2020.02); *B60W 2552/53* (2020.02); *B60W 2555/60* (2020.02); *G06T 2207/10048* (2013.01); *G06T 2207/30204* (2013.01); *G06T 2207/30256* (2013.01)

(58) Field of Classification Search
CPC . G06T 7/73; G06T 7/246; G06T 2207/10048; G06T 2207/30204; G06T 2207/30256; B60W 60/001; B60W 2420/403; B60W 2520/10; B60W 2520/12; B60W 2520/16; B60W 2552/50; B60W 2552/53; B60W 2555/60; B60W 2420/42; B60W 60/00
USPC .......... 701/25, 726, 41, 48, 60, 65; 340/465, 340/466, 467; 342/69, 71
See application file for complete search history.

(56) References Cited

U.S. PATENT DOCUMENTS

| | | | | |
|---|---|---|---|---|
| 4,811,228 A | * | 3/1989 | Hyyppa | G05D 1/0236 701/25 |
| 5,856,844 A | * | 1/1999 | Batterman | G09B 9/307 345/158 |

(Continued)

FOREIGN PATENT DOCUMENTS

| | | | | |
|---|---|---|---|---|
| DE | 102009002677 A1 | * | 10/2010 | ............ A61B 3/113 |
| DE | 102011111051 A1 | * | 3/2012 | ......... B60L 11/1833 |

(Continued)

OTHER PUBLICATIONS

Machine Translation of Patent Application Publication WO-2019093316-A1 of Keisuke Watanabe. (Year: 2019).*

(Continued)

*Primary Examiner* — Ramon A. Mercado
*Assistant Examiner* — Ellis B. Ramirez

(57) ABSTRACT

A method of autonomous vehicle control, comprising: receiving an image of a lenticular human-imperceptible marker embedded in an element of an environment that an autonomous vehicle is moving in, the marker having a pattern usable for determining positional data of the moving vehicle, the image captured using human-invisible light, analyzing the received image of the human-imperceptible marker, and controlling the autonomous vehicle based on the analyzed image of the human-imperceptible marker.

21 Claims, 6 Drawing Sheets

(56) References Cited

U.S. PATENT DOCUMENTS

| | | | | |
|---|---|---|---|---|
| 7,228,634 | B1* | 6/2007 | Reich | G01C 1/00 |
| | | | | 356/138 |
| 9,080,866 | B1* | 7/2015 | Dowdall | G01C 3/08 |
| 2001/0050765 | A1* | 12/2001 | Antonelli | G06V 40/1335 |
| 2014/0160572 | A1* | 6/2014 | Moon | G02B 27/06 |
| 2018/0108179 | A1* | 4/2018 | Tomlin | G06F 3/0346 |
| 2019/0361448 | A1* | 11/2019 | Tietze | G01S 17/06 |
| 2021/0286986 | A1* | 9/2021 | Krauthamer | G06K 19/06037 |
| 2022/0091611 | A1* | 3/2022 | Lai | G05D 1/0212 |

FOREIGN PATENT DOCUMENTS

| | | | | |
|---|---|---|---|---|
| DE | 102014211106 A1 * | 12/2015 | | B60W 30/06 |
| DE | 102014015668 A1 * | 4/2016 | | B60L 53/36 |
| EP | 3153940 A1 * | 4/2017 | | G05D 1/0684 |
| WO | WO-2019093316 A1 * | 5/2019 | | |

OTHER PUBLICATIONS

Machine Translation of Patent Application Publication DE-102009002677-A1 of C. Lange. (Year: 2010).*

Suzuki et al. "The First Experiment of a High-Accuracy 2D Color Marker in Space", Proceedings of the International Symposium on Artificial Intelligence, Robotics and Automation in Space, i-SAIRAS 2016, Beijing, China, Jun. 20-22, 2016, p. 1-8, Jun. 20, 2016.

Tanaka "Ultra-High-Accuracy Visual Marker for Indoor Precise Positioning", 2020 IEEE International Conference on Robotics and Automation, ICRA, Paris, France, May 31-Aug. 31, 2020, p. 2338-2343, May 31, 2020.

Tanaka et al. "A Visual Marker for Precise Pose Estimation Based on a Microlens Array", 21st International Conference on Pattern Recognition, ICPR 2012, Tsukuba, Japan, Nov. 11-15, 2012.

* cited by examiner

AUTONOMOUS VEHICLE CONTROL

FIELD AND BACKGROUND OF THE INVENTION

The present invention relates to autonomous vehicle technologies and more particularly, but not exclusively, to a method and system for controlling an autonomous vehicle.

One of the challenges facing current autonomous vehicle driving technologies is a one of helping an autonomous vehicle see and navigate the world around the vehicle in a safe and precise way.

To overcome that challenge, the vehicle needs to have reliable knowledge about the environment that the vehicle navigates in—in general, and about the vehicle's precise position and velocity—in particular.

To achieve that knowledge, autonomous vehicles have been equipped with sensing technologies that allow a vehicle to see the world around the vehicle, with navigation technologies that provide input about the area that the vehicle needs to navigate in, to the vehicle, etc.

Such technologies have included radar, LIDAR (light detection and ranging), navigation systems that are based on GPS (Global Positioning Systems) receivers or INS (inertial navigation system) sensors (such as inertial motion sensors and odometry sensors), mapping services such as Google™ Map or Waze™, etc.

However, such sensing and mapping technologies may fail to provide an autonomous vehicle with positional data having the accuracy and precision now needed for autonomous driving, and may also prove to be too expensive for high volume manufacturing of vehicles capable of autonomous driving.

Further, such technologies may fail to provide autonomous vehicles with information adapted to precise location, velocity, or attitude of the autonomous vehicle.

SUMMARY OF THE INVENTION

According to one aspect of the present invention, there is provided a method of autonomous vehicle control, the method comprising: receiving an image of a lenticular human-imperceptible marker embedded in an element of an environment that an autonomous vehicle is moving in, the marker having a pattern usable for determining positional data of the moving vehicle, the image captured using human-invisible light, analyzing the received image of the human-imperceptible marker, and controlling the autonomous vehicle based on the analyzed image of the human-imperceptible marker.

According to a second aspect of the present invention, there is provided a system for autonomous vehicle control, the system comprising: a processing circuitry and a memory in communication with the processing circuitry, the memory containing instructions that, when executed by the processing circuitry, cause the system to: receive an image of a lenticular human-imperceptible marker embedded in an element of an environment that an autonomous vehicle is moving in, the marker having a pattern usable for determining positional data of the moving vehicle, the image captured using human-invisible light, analyze the received image of the human-imperceptible marker, and control the autonomous vehicle based on the analyzed image of the human-imperceptible marker.

According to a third aspect of the present invention, there is provided a non-transitory computer readable medium having stored thereon instructions for causing a processing circuitry to perform a process of autonomous vehicle control, the process comprising: receiving an image of a lenticular human-imperceptible marker embedded in an element of an environment that an autonomous vehicle is moving in, the marker having a pattern usable for determining positional data of the moving vehicle, the image captured using human-invisible light, analyzing the received image of the human-imperceptible marker, and controlling the autonomous vehicle based on the analyzed image of the human-imperceptible marker.

According to a fourth aspect of the present invention, there is provided a non-transitory computer readable medium having stored thereon instructions for causing a processing circuitry to perform a process of autonomous vehicle control, the process comprising: receiving an image of a lenticular human-imperceptible marker embedded in an element of an environment that an autonomous vehicle is moving in, the marker having a pattern usable for determining positional data of the moving vehicle, the image captured using human-invisible light, analyzing the received image of the human-imperceptible marker, and controlling the autonomous vehicle based on the analyzed image of the human-imperceptible marker.

According to a fifth aspect of the present invention, there is provided an element of an environment of autonomous vehicle movement, comprising: a lenticular marker covered by a layer opaque to human-visible light but at least partially transparent to human invisible light, the marker having a pattern usable for determining positional data of a vehicle moving in the environment.

According to a sixth aspect of the present invention, there is provided a method of manufacturing an element of an environment of autonomous vehicle movement, the method comprising: receiving an element of an environment of vehicle movement, applying a lenticular marker onto a substrate, the marker having a pattern usable for determining positional data of a vehicle moving in the environment, covering the substrate with a layer opaque to human-visible light but at least partially transparent to human invisible light, and embedding the substrate in the received element.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE SEVERAL VIEWS OF THE DRAWING(S)

The invention is herein described, by way of example only, with reference to the accompanying drawings.

With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention, the description taken with the drawings making apparent to those skilled in the art how the several forms of the invention may be embodied in practice.

Figure 1:
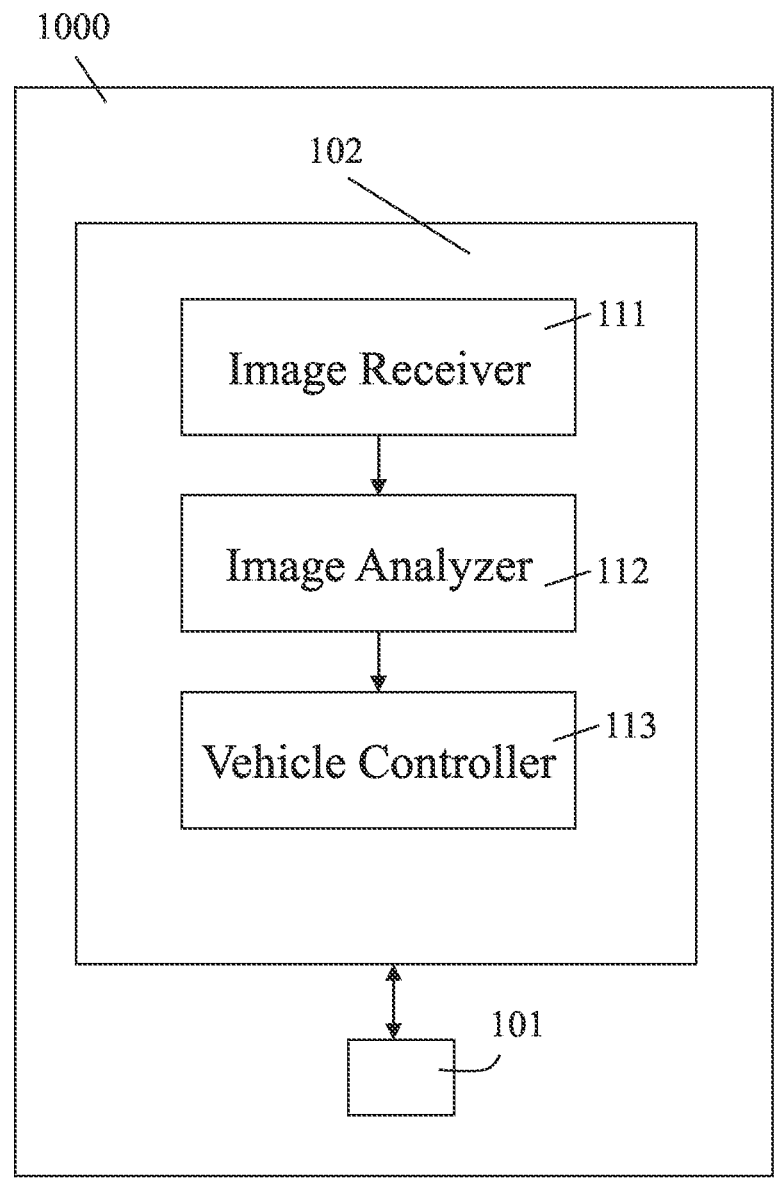
FIG. 1 is a block diagram schematically illustrating an exemplary system of autonomous vehicle control, according to an exemplary embodiment of the present invention.

DESCRIPTION OF SPECIFIC EMBODIMENTS
OF THE INVENTION

The present embodiments comprise a system and a method of autonomous vehicle control.

An autonomous vehicle as referenced hereinbelow, may include any vehicle capable of sensing the vehicle's environment and moving safely based on that sensing, with no human input, or with some human input. An autonomous vehicle has the computer systems needed to replace human capabilities used in car driving.

In some examples, the autonomous vehicle may be a one capable of driving independently with no driver.

In other examples, the autonomous vehicle may rather be a one in which a human driver of the vehicle is assisted in certain parts or aspects of her driving, say a human driven vehicle equipped with one or more ADAS systems (Advance Driver Assistance Systems), as known in the art.

In some examples, the driver may be assisted by autonomously carrying out an aspect of driving (say by automatically changing lanes in a highway) or rather, by providing the human driver with information that may help her driving, say by warning (say using a head-up display) the driver that the vehicle is in a wrong lane, for example, when the driver activates one of the vehicle's turn signals, as known in the art.

For example, in 2021, Tesla™ cars are autonomous vehicles equipped with Tesla's AutoPilot™ system that is a suite of driver-assistance features such as: traffic-aware cruise control, self-parking, automatic lane changes, semi-autonomous navigation on limited access freeways, etc.

In 2021, some Tesla™ cars are also equipped with what Tesla™ defines as Full Save Driving (SFD) capabilities that are supposed to allow a vehicle to drive fully autonomously on highways and city roads.

As described hereinabove, such an autonomous vehicle needs to see and navigate the world around the vehicle, in a safe and precise way. To achieve that, autonomous vehicles have been equipped with sensing technology that allows a vehicle to see the world around the vehicle, as well as with navigation technology that may be based, for example, on mapping services such as Google™ Map and Waze™.

An alternative or additional way of supporting autonomous vehicle driving includes the use of two dimensional (2D) visual markers such as QR (Quick Response) codes, AprilTags, or Aruco Markers, in the autonomous vehicle's environment, as known in the art.

Such 2D visual markers provide positional information when images of the markers are processed through geometric calculations based on projective transformation, say using the position of four corner points of a marker in the marker's image as captured by a camera, as known in the art.

However, with such projection transformation of a 2D visual marker, the accuracy in pose estimation tends to get worse when viewing the two-dimensional marker from frontal direction, because in such circumstances, a small detection error may correspond to a large angle change.

Thus, such a 2D visual marker, while possibly easy to detect, is not likely to provide sufficient angular resolution for an image captured by an imaging device installed on an autonomous vehicle moving in front of the marker, such that the vehicle's position may be determined with sufficient accuracy and precision.

An exemplary embodiment of the present invention rather utilizes lenticular markers, say a printed image covered with lenticular lenses, such that the printed image is perceived with an illusion of depth, change or of movement, when viewed from different angles or distances, as known in the art (for example, in the field of lenticular printing).

According to the exemplary embodiment, one or more lenticular markers are embedded in an element of the environment that autonomous vehicles move in, say in a traffic sign, a road mark, a fence, a street light, a traffic light, a pole, a road barrier, etc., as described in further detail hereinbelow.

According to the exemplary embodiment, the lenticular marker is designed, such that changes or movement of the marker, as viewed from different locations of the vehicle, allow the vehicle's processing circuitry to determine the vehicle's location, velocity, attitude, etc., or any combination thereof, as described in further detail hereinbelow.

Optionally, the lenticular marker is designed such that, when viewed from a distance expected between the vehicle and the element of the environment, the marker's appearance differs with a changing viewing angle, and potentially, the marker's appearance for each different viewing angle range can be predicted accurately.

Optionally, the lenticular marker of the example is based on LentiMarks or on ArrayMarks, as known in the art.

LentiMarkers have been described by Hideyuki Tanaka, for example, in his publication entitled "Ultra-High-Accuracy Visual Marker for Indoor Precise Positioning", the 2020 IEEE International Conference on Robotics and Automation (ICR), 31 May-31 Aug. 2020, Paris, France.

A LentiMark marker or an ArrayMark lenticular marker is created by printing a Moire pattern of a spatial frequency similar, but not identical, to that of an array of lenticular lenses deployed on the printed pattern, such that a phase difference exists between the printed pattern and the lenses, as known in the art.

As a result, when viewed from a distance, the ArrayMark lenticular marker looks differently from different viewing angles, which difference in turn, may code for a different position of the vehicle, as described in further detail hereinbelow.

Further, the lenticular marker of the example is covered with a layer that is opaque to human-visible light but is, at least partially, transparent to human invisible light, say a marker opaque to human-visible light but transparent to Near-Infrared (NIR) light, as described in further detail hereinbelow.

Thus, according to an exemplary embodiment, a standard traffic sign, pole, road mark, or other element of an environment that an autonomous vehicle moves in, is embedded with a lenticular marker covered with a layer, which layer is opaque to human-visible light, but is at least partially transparent to human invisible light.

As a result, the environment element may bear the lenticular marker usable for determining positional data of the autonomous vehicle, while potentially, remaining compliant with regulatory standards of signage and road marking. Further with the layer that is opaque to human-visible light, there may be avoided diversion of driver attention to the markers applied to the traffic sign or other element.

Exemplary embodiments of the present invention thus use a human-imperceptible but vehicle-perceptible marker that is embedded in an element of an environment the vehicle is moving in.

Additionally or alternatively, the lenticular markers covered with the layer that is opaque to human-visible light but is, at least partially, transparent to human invisible light, may be embedded in an element of the vehicle itself (say in the vehicle's registration plate, trunk door, etc.).

Thus, the lenticular markers may also be used in road tolling, V2X (Vehicle to Everything) or V2V (Vehicle to Vehicle) applications, without effecting the vehicle's human-visible appearance.

The principles and operation of a system and a method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 1 which is a simplified block diagram schematically illustrating an exemplary system of autonomous vehicle control, according to an exemplary embodiment of the present invention.

A system 1000 for autonomous vehicle control, according to an exemplary embodiment of the present invention may be implemented using electric circuits, computer software, computer hardware, etc., or any combination thereof.

Optionally, the system 1000 is installed on an autonomous vehicle, say on a vehicle capable of sensing the vehicle's environment and moving safely based on that sensing, with no human input, or with some human input, as described in further detail hereinabove.

Optionally, the system 1000 includes one or more electric circuits, say a circuit that includes one or more computer processor(s) 101 and at least one computer memory 102, say one or more circuits of a computer or circuits of two or more computers.

The computer memory 102 may include, but is not limited to: a Hard Disk Drive, a Solid State Drive, a ROM chip, a DRAM component or another RAM component, a cache memory component of the computer processor 101, etc., or any combination thereof, say a medium 3000 as described in further detail hereinbelow.

The at least one computer memory 102 stores instructions that are executable by the at least one computer processor 101, other parts of the circuitry, or both, for causing the system 1000 to perform the steps of the exemplary method described in further detail and illustrated using FIG. 2 hereinbelow.

In one exemplary embodiment, the computer processor 101 is programmed to perform the instructions, and thereby implement one or more additional parts (say modules) of the system 1000, say parts 111-113 presented in FIG. 1.

Optionally, one or more of the parts 111-113 is rather implemented as one or more electric circuits (say a logic circuit), or rather as combination of one or more electric circuits and the computer processor 101.

Each one of parts 111-113 may thus be implemented as software—say by programming the computer processor(s) 101 to execute at least a part of the exemplary method described in further detail hereinbelow, as hardware—say as one or more hardware part of the electric circuit(s) that implement(s) at least a part of the exemplary method, etc., or any combination thereof.

Accordingly, the system 1000 includes an image receiver 111.

The image receiver 111 is configured, say by execution of one or more of the instructions stored on the computer memory 102, to receive an image of a human-imperceptible marker embedded in an element of an environment that an autonomous vehicle is moving in, the image captured using human-invisible light.

The human-imperceptible marker may be a lenticular marker, as known in the art.

The lenticular marker may be, for example, a printed image covered with lenticular lenses, such that when viewed from different angles or distances, the printed image is perceived with an illusion of depth, change, or movement, as known in the art, for example, in the field of lenticular printing.

For example, the lenticular marker may be a one designed such that, when viewed from a distance expected between the vehicle and the marker, the pattern's appearance differs with a changing viewing angle, and potentially, the pattern's appearance for each different viewing angle range can be predicted accurately.

In the example, changes or movement of the marker, as viewed from different locations of the vehicle, allow the vehicle's processing circuitry to determine the vehicle's location, velocity, attitude, etc., or any combination thereof, as described in further detail hereinbelow.

Optionally, the lenticular marker of the example is based on LentiMarks or on ArrayMarks, as known in the art.

LentiMarkers have been described by Hideyuki Tanaka, for example, in his publication entitled "Ultra-High-Accuracy Visual Marker for Indoor Precise Positioning", the 2020 IEEE International Conference on Robotics and Automation (ICR), 31 May-31 Aug. 2020, Paris, France.

One exemplary ArrayMark has been described by Hideyuki Tanaka, for example, in his publication entitled "A Visual Marker for Precise Pose Estimation Based on a Microlens Array", to Hideyuki Tanaka et al., the 21st International Conference on Pattern Recognition (ICPR 2012), Nov. 11-15, 2012. Tsukuba, Japan, as described in further detail hereinbelow.

A LentiMark marker or an ArrayMark lenticular marker is created by printing a Moire pattern of a spatial frequency similar, but not identical, to that of an array of lenticular lenses deployed on the printed pattern, such that a phase difference exists between the printed pattern and the lenses, as known in the art.

When viewed from a distance, the lenticular marker looks differently from different viewing angles, which difference in turn, may indicate a different position of the vehicle, as described in further detail hereinbelow.

Further, the lenticular marker of the example is covered with a layer that is opaque to human-visible light but is, at least partially, transparent to human invisible light, say a layer opaque to human-visible light but transparent to Near-Infrared (NIR) light, as described in further detail hereinbelow.

Further in the example, a standard traffic sign, pole, road mark, or other element of an environment that the autonomous vehicle is moving in, is embedded with the lenticular marker covered with the layer, which layer is opaque to human-visible light, but is at least partially transparent to human invisible light.

As a result, the environment element may bear the lenticular marker usable for determining positional data of the autonomous vehicle, while potentially, remaining compliant with regulatory standards of signage and road marking. Further, with the layer that is opaque to human-visible light, there may be avoided diversion of driver attention to the markers applied to the traffic sign or other element.

An exemplary embodiment of the present invention thus uses a human-imperceptible but vehicle-perceptible marker that is embedded in an element of an environment the vehicle is moving in.

In one example, the image is captured using an infrared (IR) thermal imaging camera, a shortwave infrared (SWIR) camera, a CMOS camera with a near infrared (NIR) filter (say a 850 nm long-pass filter), or another image capturing device capable of capturing images in NIR or SWIR—say in the 700-1000 nm wavelength range, 1000-3000 nm wavelength range, or both.

In the example, the image capturing device is installed on the autonomous vehicle, say on the vehicle's windshield or other frontal part.

Thus, optionally, the system 1000 further includes an image capturing device (not shown on FIG. 1) that is used to capture the image of the lenticular marker, which image capturing device is in communication with the image receiver 111, as described in further detail hereinabove.

Optionally, the human-imperceptible marker is a lenticular marker covered with a plastic polymer (say a matte black plastic cover) that is opaque to human-visible light but is transparent to one or more types of human-invisible light.

Optionally, the plastic polymer of the example is opaque to human-visible light, but transparent to IR light. As a result, the lenticular marker is invisible to human eyes, but is visible in IR, and can therefore be imaged by an IR imaging camera, a SWIR camera, or another image capturing device adapted for capturing images in IR or SWIR, as known in the art.

Optionally, the human-imperceptible marker is rather covered with a special dye or other material that is opaque to human-visible light but is transparent to IR light, as known in the art.

The system 1000 further includes an image analyzer 112, in communication with the image receiver 111.

The image analyzer 112 is configured, say by execution of one or more of the instructions stored on the computer memory 102, to analyze the received image of the human-imperceptible marker, for determining positional data of the vehicle, as described in further detail hereinbelow.

The positional data may include, for example, the vehicle's position, the vehicle's attitude, the vehicle's velocity, another indicator pertaining to the vehicle's position, etc., or any combination thereof.

Optionally, the image analyzer 112 determines the vehicle's positional data using one or more of the methods described in length in Hideyuki Tanaka's publication entitled "Ultra-High-Accuracy Visual Marker for Indoor Precise Positioning", the 2020 IEEE International Conference on Robotics and Automation (ICR), 31 May-31 Aug. 2020, Paris, France.

Optionally, the image analyzer 112 determines the vehicle's positional data using one or more of the methods described in length in the publication entitled "The first experiment of high-accuracy 2D color maker in space", to Suzuki et al., Proceedings of the International Symposium on Artificial Intelligence, Robotics and Automation in Space (i-SAIRAS), 2016.

Optionally, the image analyzer 112 determines the vehicle's positional data using one or more of the methods described in length in the publication entitled "A Visual Marker for Precise Pose Estimation Based on a Microlens Array", to Hideyuki Tanaka et al., the 21st International Conference on Pattern Recognition (ICPR 2012), Nov. 11-15, 2012. Tsukuba, Japan.

The system 1000 further includes a vehicle controller 113, in communication with the image analyzer 112.

The vehicle controller 113 is configured, say by execution of one or more of the instructions stored on the computer memory 102, to control the vehicle, based on the image analyzed by the image analyzer 112.

Optionally, the vehicle controller 113 controls the vehicle by preparing and sending a control massage to one or more of the vehicle's Electric Control Units (ECUs), say to the vehicle's engine control module (ECM), Brake Control Module (BCM), Central Control Module (CCM), Suspension Control Module (SCM), etc., as known in the art.

Optionally, the control message is sent over an internal communications network of the vehicle, say over the vehicle's bus, as known in the art. Thus, in one example, the vehicle controller 113 sends the control message over a CAN (Control Area Network) bus of the vehicle, as known in the art.

Optionally, the vehicle controller 113 controls the vehicle, by directly controlling one or more of the vehicle's units, say through direct communication with one or more of the vehicle's units, say a computer screen or an infotainment system of the vehicle.

In a first example, the image's analysis by the image analyzer 112 shows that the vehicle's position is on a wrong lane (say a one that diverts the vehicle from a route chosen by the vehicle's navigation system).

In the example, the vehicle controller 113 controls the vehicle's steering wheel and signal lights, using ECUs in control of the steering wheel and signal lights, so as to automatically move the vehicle to a different lane.

In a second example, the analyzed image shows that the vehicle can progress a few meters forward, to a stop line, and the vehicle controller 113 controls the vehicle's engine and breaks, by sending one or more control messages that cause the vehicle to move forward.

In a third example, based on the analyzed image, the vehicle controller 113 controls the vehicle's infotainment system, so as to present relevant information or warnings on the vehicle's computer screen or give a voice message on the vehicle's speaker, say a warning about a lane change needed.

In a fourth example, a series of two or more of the images captured in a few minutes difference (say three minutes) from each other, is received by the image receiver 111, and analyzed by the image analyzer 112 to determine an average velocity of the vehicle.

In the fourth example, the analyzed images are used by the vehicle controller 113 to calculate the expected arrival time of the vehicle to a destination selected by a driver or passenger of the vehicle, and present the expected time of arrival on the vehicle's computer screen.

In a fifth example, a series of two or more of the images captured in a few seconds difference from each other, is received by the image receiver 111, and is analyzed by the image analyzer 112 to determine an average velocity of the vehicle.

In the fifth example, the analyzed images are used by the vehicle controller 113 to calculate the force that needs to applied to the vehicle's breaks, for stopping the vehicle before a stop line, and to automatically apply the calculated force to the vehicle's breaks, by sending one or more control messages to the vehicle's engine control module (ECM), Brake Control Module (BCM), or both.

Figure 2:
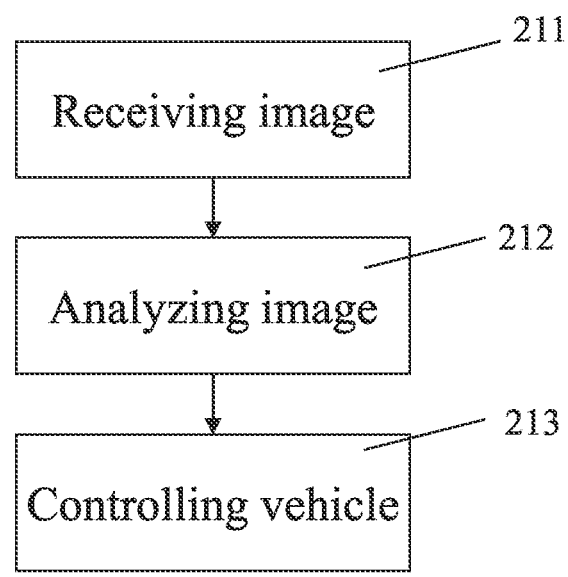
FIG. 2 is a simplified flowchart illustrating an exemplary method of autonomous vehicle control, according to an exemplary embodiment of the present invention.

Reference is now made to FIG. 2 which is a simplified flowchart illustrating an exemplary method of autonomous vehicle control, according to an exemplary embodiment of the present invention.

The exemplary method may be implemented, for example, by system 1000, as described in further detail hereinabove.

Optionally, the exemplary method is implemented on an autonomous vehicle that is capable of sensing the vehicle's environment and moving safely based on that sensing, with no human input, or with some human input, as described in further detail hereinabove.

Optionally, the method is implemented using one or more computer executed instructions, executed by one or more computer processors, as described in further detail hereinabove.

In the method, there is received 211 an image of a human-imperceptible marker embedded in an element of an environment that an autonomous vehicle is moving in, say by the image receiver 111 of system 1000. The image is captured using human-invisible light, as described in further detail hereinabove.

The human-imperceptible marker may be a lenticular marker, say a printed image covered with lenticular lenses, such that the printed image is perceived with an illusion of depth, change, or movement, when viewed from different angles or distances, as described in further detail hereinabove.

For example, the lenticular marker may be designed such that, when viewed from a distance expected between the vehicle and the marker, the pattern's appearance differs with a changing viewing angle, and potentially, the pattern's appearance for each different viewing angle range can be predicted accurately.

In the example, changes or movement of the marker, as viewed from different locations of the vehicle, allow the vehicle's processing circuitry to determine the vehicle's location, velocity, attitude, etc., or any combination thereof, as described in further detail hereinbelow.

Optionally, the lenticular marker of the example is based on LentiMarks or on ArrayMarks, as described in further detail hereinabove.

A LentiMark marker or an ArrayMark lenticular marker is created by printing a Moire pattern of a spatial frequency similar, but not identical, to that of an array of lenticular lenses deployed on the printed pattern, such that a phase difference exists between the printed pattern and the lenses, as known in the art.

When viewed from a distance, the lenticular marker looks differently from different viewing angles, which difference in turn, may indicate a different position of the vehicle, as described in further detail hereinbelow.

Further, the lenticular marker of the example is covered with a layer that is opaque to human-visible light but is, at least partially, transparent to human invisible light, say a layer that is opaque to human-visible light but is transparent to Near-Infrared (NIR) light, as described in further detail hereinabove.

Further in the example, a standard traffic sign, pole, road mark, or other element of an environment that the autonomous vehicle is moving in, is embedded with the lenticular marker covered with the layer, which layer is opaque to human-visible light, but is at least partially transparent to human invisible light.

As a result, the environment element may bear the lenticular marker usable for determining positional data of the autonomous vehicle, while potentially, remaining compliant with regulatory standards of signage and road marking. Further, with the layer that is opaque to human-visible light, there may be avoided diversion of driver attention to the markers applied to the traffic sign or other element.

An exemplary embodiment of the present invention thus uses a human-imperceptible but vehicle-perceptible marker that is embedded in an element of an environment the vehicle is moving in.

Optionally, the method further includes capturing the image, say by the image capturing device of system 1000, as described in further detail hereinabove.

In one example, the image is captured using an infrared (IR) thermal imaging camera, a shortwave infrared (SWIR) camera, a CMOS camera with a near infrared (NIR) filter (say a 850 nm long-pass filter), or another image capturing device capable of capturing cameras in NIR or SWIR—say in the 700-1000 nm wavelength range, 1000-3000 nm wavelength range, or both.

In the example, the image capturing device is installed on the autonomous vehicle, say on the vehicle's windshield or other frontal part.

Optionally, the human-imperceptible marker is a lenticular marker covered with a plastic polymer or other layer that is opaque to human-visible light but is transparent to at least some types of human-invisible light, as described in further detail hereinabove.

Optionally, the plastic polymer is say a mate black plastic cover that is opaque to human-visible light, but is transparent to IR light. As a result, the lenticular marker is invisible to human eyes, but is visible in IR, and can therefore be imaged by an IR imaging camera, a SWIR camera, or another image capturing device adapted for capturing images in IR or SWIR, as known in the art.

The method further includes analyzing 212 the received 211 image of the human-imperceptible marker, say by the image analyzer 112 of system 1000, for determining positional data of the vehicle.

The positional data may include, for example, the vehicle's position, the vehicle's attitude, the vehicle's velocity, another indicator pertaining to the vehicle's position, etc., or any combination thereof.

Optionally, the vehicle's positional data is determined 212 using one or more of the methods described in length in Hideyuki Tanaka's publication entitled "Ultra-High-Accuracy Visual Marker for Indoor Precise Positioning", the 2020 IEEE International Conference on Robotics and Automation (ICR), 31 May-31 Aug. 2020, Paris, France.

Optionally, the vehicle's positional data is determined 212 using one or more of the methods described in length in the publication entitled "The first experiment of high-accuracy 2D color maker in space", to Suzuki et al., Proceedings of the International Symposium on Artificial Intelligence, Robotics and Automation in Space (i-SAIRAS), 2016.

Optionally, the vehicle's positional data is determined 212 using one or more of the methods described in length in the publication entitled "A Visual Marker for Precise Pose Estimation Based on a Microlens Array", to Hideyuki Tanaka et al., the 21st International Conference on Pattern Recognition (ICPR 2012), Nov. 11-15, 2012. Tsukuba, Japan.

The method further includes controlling 213 the vehicle, based on the analyzed 212, say by the vehicle controller 113 of system 1000, as described in further detail hereinabove.

Optionally, the vehicle is controlled 213 by preparing and sending a control massage to one or more of the vehicle's Electric Control Units (ECUs), say to the vehicle's engine control module (ECM), Brake Control Module (BCM), Central Control Module (CCM), Suspension Control Module (SCM), etc., as known in the art.

Optionally, the control message is sent over an internal communications network of the vehicle, say over the vehicle's bus, as known in the art. Thus, in one example, the message is sent over a CAN (Control Area Network) bus of the vehicle.

Optionally, the vehicle is controlled 213 by directly controlling one or more of the vehicle's units, say through direct communication with one or more of the vehicle's units, say a computer screen or an infotainment system of the vehicle, as described in further detail hereinabove.

In a first example, the analysis 212 of the received 211 image shows that the vehicle's position is on a wrong lane (say one that diverts the vehicle from a route chosen by the vehicle's driver).

In the first example, the vehicle's steering wheel and signal lights are controlled 213, using ECUs in control of the steering wheel and signal lights, so as to automatically move the vehicle to a different lane.

In a second example, the analyzed 212 image shows that the vehicle can progress a few meters forward, to a stop line, and the vehicle is controlled 213, by sending one or more control messages that control the vehicle's engine and breaks, so as to cause the vehicle to move forward.

In a third example, based on the analyzed 212 image, the vehicle is controlled 213, by instructing the vehicle's infotainment system to present relevant information or warnings on the vehicle's computer screen or give a voice message on the vehicle's speaker, say a warning about a lane change needed.

In a fourth example, a series of two or more of the images captured in a few minutes difference (say four minutes) from each other, are received 211 and analyzed 212, to determine an averaged velocity of the vehicle.

In the fourth example, the analyzed 212 images are used to calculate the expected arrival time of the vehicle to a destination selected by a driver or passenger of the vehicle, and the vehicle is controlled 213, for presenting the expected time of arrival on the vehicle's computer screen.

In a fifth example, a series of two or more of the images captured in a few seconds difference from each other, is received 211 and analyzed 212, to determine an averaged velocity of the vehicle.

In the fifth example, the analyzed 212 images are used to calculate the force that needs to be applied to the vehicle's breaks, to bring the vehicle into a stop before a stop line. In the fifth example, the vehicle is controlled 213 for applying the calculated force to the vehicle's breaks, by sending one or more control messages to the vehicle's engine control module (ECM), Brake Control Module (BCM), or both, as described in further detail hereinabove.

Figure 3:
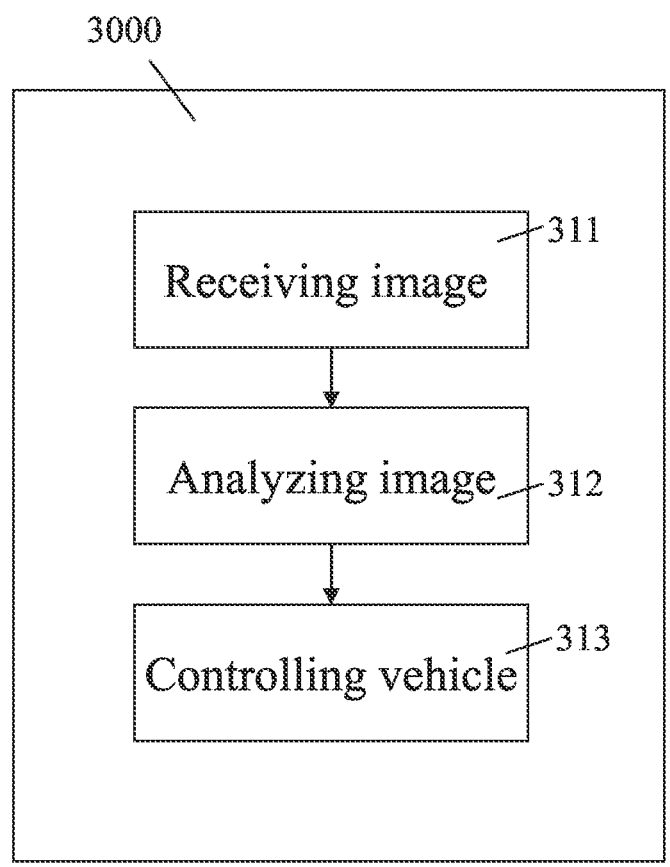
FIG. 3 is a block diagram schematically illustrating an exemplary non-transitory computer readable medium having stored thereon instructions for causing a processing circuitry to perform a process of autonomous vehicle control, according to an exemplary embodiment of the present invention.

Reference is now made to FIG. 3 which is a block diagram schematically illustrating an exemplary non-transitory computer readable medium having stored thereon instructions for causing a processing circuitry to perform a process of autonomous vehicle control, according to an exemplary embodiment of the present invention.

According to an exemplary embodiment of the present invention, there is provided a non-transitory computer readable medium 3000.

The medium 3000 may include, but is not limited to, a Micro SD (Secure Digital) Card, a CD-ROM, a USB-Memory, a Hard Disk Drive (HDD), a Solid State Drive (SSD), a computer's ROM chip, a DRAM (Dynamic Random Access Memory) or other RAM (Random Access Memory) component, a cache memory component of a computer processor, etc., or any combination thereof, as known in the art.

In one example, the computer readable medium 3000 is a part of a system used to implement the exemplary method illustrated in FIG. 2, say of system 1000, as described in further detail hereinabove.

Optionally, the instructions are computer-executable instructions coded and stored on the medium 3000 by a programmer. The instructions may be executed on one or more computers, say by one or more processors of the computer(s) of system 1000, as described in further detail hereinabove.

The instructions include a step of receiving 311 an image of a human-imperceptible marker embedded in an element of an environment that an autonomous vehicle is moving in, the image captured using human-invisible light, as described in further detail hereinabove.

The human-imperceptible marker may be a lenticular marker, say a printed image covered with lenticular lenses, such that when viewed from different angles or distances, the printed image is perceived with an illusion of depth, change, or movement, as described in further detail hereinabove.

For example, the lenticular marker may be designed such that, when viewed from a distance expected between the vehicle and the marker, the pattern's appearance differs with a changing viewing angle, and potentially, the pattern's appearance for each different viewing angle range can be predicted accurately.

Optionally, the lenticular marker of the example is based on LentiMarks or on ArrayMarks, as described in further detail hereinabove.

A LentiMark marker or an ArrayMark lenticular marker is created by printing a Moire pattern of a spatial frequency similar, but not identical, to that of an array of lenticular lenses deployed on the printed pattern, such that a phase difference exists between the printed pattern and the lenses, as known in the art.

When viewed from a distance, the lenticular marker looks differently from different viewing angles. The difference in the looks may indicate a different position of the vehicle, as described in further detail hereinabove.

Further, the lenticular marker of the example is covered with a layer that is opaque to human-visible light but is, at least partially, transparent to human invisible light, say a layer that is opaque to human-visible light but transparent to Near-Infrared (NIR) light or to Shortwave Infrared (SWIR) light, as described in further detail hereinabove.

Thus, in one example case, the layer that covers the lenticular marker is opaque to human-visible light but is at least partially, transparent to NIR light in the 700-1000 nanometer wavelength range.

In a second exemplary case, the layer that covers the lenticular marker is opaque to human-visible light but is at least partially, transparent to SWIR light in the 1000-3000 nanometer wavelength range.

Further in the examples, a standard traffic sign, pole, road mark, or other element of an environment that the autonomous vehicle is moving in, is embedded with the lenticular marker covered with the layer, which layer is opaque to human-visible light, but is at least partially transparent to human invisible light.

As a result, the environment element may bear the lenticular marker usable for determining positional data of the autonomous vehicle, while potentially, remaining compliant with regulatory standards of signage and road marking.

Further with the layer that is opaque to human-visible light, there may be avoided diversion of driver attention to the markers applied to the traffic sign or other element.

An exemplary embodiment of the present invention thus uses a human-imperceptible but vehicle-perceptible marker that is embedded in an element of an environment the vehicle is moving in.

Optionally, the instructions further implement a step of capturing the image, received 311 after the capturing, say by operating the image capturing device of system 1000, as described in further detail hereinabove.

In one example, the image is captured using an infrared (IR) thermal imaging camera, a shortwave infrared (SWIR) camera, a CMOS camera with a near infrared (NIR) filter (say a 850 nm long-pass filter), or another image capturing device capable of capturing cameras in NIR or SWIR—say in the 700-1000 nm wavelength range, 1000-3000 nm wavelength range, or both.

In the example, the image capturing device is installed on the autonomous vehicle, say on the vehicle's windshield or other frontal part.

Optionally, the human-imperceptible marker is a lenticular marker covered with a plastic polymer that is opaque to human-visible light but is transparent to IR light, say a mate black plastic cover, as described in further detail hereinabove.

The instructions further include a step of analyzing 312 the received 311 image of the human-imperceptible marker, for determining positional data of the vehicle, as described in further detail hereinabove.

The positional data may include, for example, the vehicle's position, the vehicle's attitude, the vehicle's velocity, another indicator pertaining to the vehicle's position, etc., or any combination thereof.

Optionally, the vehicle's positional data is determined 312 using one or more of the methods described in length in Hideyuki Tanaka's publication entitled "Ultra-High-Accuracy Visual Marker for Indoor Precise Positioning", the 2020 IEEE International Conference on Robotics and Automation (ICR), 31 May-31 Aug. 2020, Paris, France.

Optionally, the vehicle's positional data is determined 312 using one or more of the methods described in length in the publication entitled "The first experiment of high-accuracy 2D color maker in space", to Suzuki et al., Proceedings of the International Symposium on Artificial Intelligence, Robotics and Automation in Space (i-SAIRAS), 2016.

Optionally, the vehicle's positional data is determined 312 using one or more of the methods described in length in the publication entitled "A Visual Marker for Precise Pose Estimation Based on a Microlens Array", to Hideyuki Tanaka et al., the 21st International Conference on Pattern Recognition (ICPR 2012), Nov. 11-15, 2012. Tsukuba, Japan.

The instructions further include a step of controlling 313 the vehicle, based on the analyzed 312 image, as described in further detail hereinabove.

Optionally, the vehicle is controlled 313 by preparing and sending a control massage to one or more of the vehicle's Electric Control Units (ECUs), say to the vehicle's engine control module (ECM), Brake Control Module (BCM), Central Control Module (CCM), Suspension Control Module (SCM), etc., as described in further detail hereinabove.

Optionally, the control message is sent over an internal communications network of the vehicle, say over the vehicle's bus, as known in the art. Thus, in one example, the message is sent over a CAN (Control Area Network) bus of the vehicle.

Optionally, the vehicle is controlled 313 by directly controlling one or more of the vehicle's units, say through direct communication with one or more of the vehicle's units, say a computer screen or infotainment system of the vehicle, as described in further detail hereinabove.

Figure 4A:
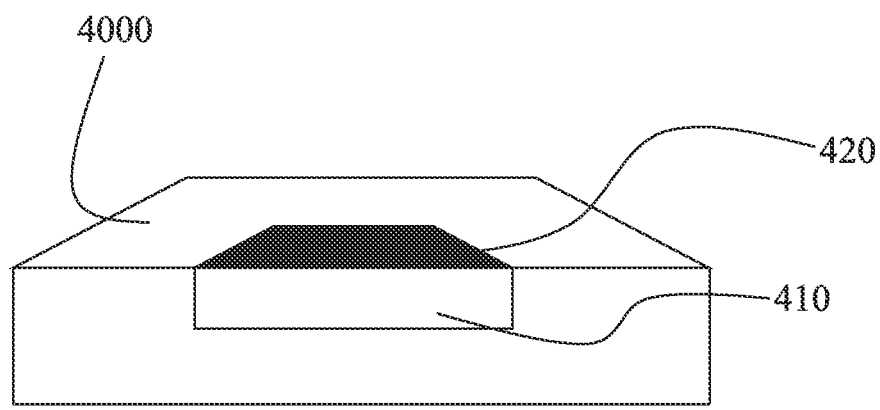
FIG. 4A is a block diagram schematically illustrating an element of an environment of autonomous vehicle movement, according to an exemplary embodiment of the present invention.

Reference is now made to FIG. 4A which is a block diagram schematically illustrating an exemplary element of an environment of autonomous vehicle movement, according to an exemplary embodiment of the present invention.

An element 4000 of an environment of autonomous vehicle movement, according to an exemplary embodiment of the present invention, includes a lenticular marker 410, as known in the art (for example, in the field of lenticular printing).

The lenticular marker 410 of the exemplary embodiment is covered by a layer 420 that is opaque to human-visible light, but is at least partially, transparent to human invisible light (say to light in a NIR or SWIR wavelength range), as described in further detail hereinabove.

Optionally, the marker 410 has a pattern that is usable for determining positional data of a vehicle moving in the environment, say an image that combines two or more base images, such that from each different, respective viewing angle, there is viewed a different one of the base images, as described in further detail hereinbelow.

Thus, when viewed from two or more different angles or distances, the image may be perceived with an illusion of depth, change or movement, as known in the art.

In one example, the image is printed on a paper, on a piece of plastic, a piece of fabric, or on another substrate, and is covered with a lenticular lens, as known in the art.

A lenticular lens is an array of lenses, designed so that when viewed from slightly different angles, there is shown a different part of the image underneath the array, as known in the art.

In the instant example, from each one of two or more different angles or distances, a respective, different one of the base images that make up the printed image is viewed, as described in further detail hereinbelow.

In a second example, the image is printed directly on the smooth, back side of the lenticular lens, as described in further detail hereinbelow. Optionally, the design of the lens array is based on four variables: a radius of a curvature of the lens, thickness of the lens array, a pitch of the lenses, and an optical refraction index of the material that the lenses are made of, as known in the art.

Optionally, when the layer 420 that is opaque to human-visible light, but is at least partially transparent to human invisible light (say a layer of NIR-transparent but visible-light absorptive material) is added, the refraction index, the thickness and the shape of the layer 420 are chosen accordingly.

For example, one or more of the above mentioned parameters may have different values in a case in which the layer 420 is of flat thickness, as opposed to a case in which the layer 420 is made of a coating applied directly to an upper surface of the lens array itself, which coating thus has a curvature that matches the curvature of the lens array.

A NIR (say around 850 nm) wavelength, if expected to be used for capturing the marker (say by a camera of a vehicle, as described in further detail hereinabove), may also affect the choice of materials (say refraction index) for the lens array, and may also affect the choice of the lens array's curvature and thickness. The fact that the marker is designed for remote viewing—typically, an outdoors viewing, from a distance from the lenticular marker, which distance is much larger than the lenticular marker's size—also affects the parameter values, as known in the art.

Optionally, to reduce specular reflections from direct sunlight or from vehicle headlights, the layer 420 further includes an anti-reflection coating, say an anti-reflection coating that is applied to the external surface of the layer 420, and that makes the layer's 420 external surface less shiny, say a coating that includes fine dust particles that may make the external surface matt.

Figure 4B:
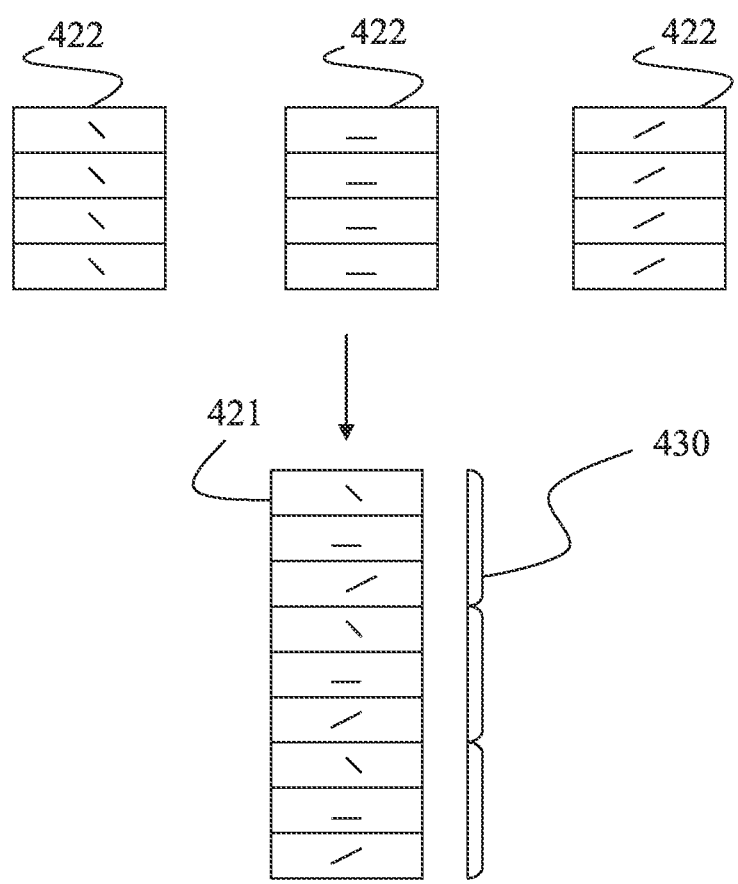
FIG. 4B is a block diagram schematically illustrating an exemplary lenticular marker, according to an exemplary embodiment of the present invention.

Reference is made to FIG. 4B which is a block diagram schematically illustrating an exemplary lenticular marker, according to an exemplary embodiment of the present invention.

An exemplary lenticular marker 410, according to an exemplary embodiment of the present invention, includes an image 421 that is made of two or more base images 422.

In one example, each base image 422 is stored as an image file and is arranged (say by line indexes) into a plurality of strips (each strip corresponding to a sequence of one or more of the lines), as known in the art.

When the image is printed on the substrate, the strips are printed and interlaced with one or more similarly arranged base images 422's strips, to create the printed image 421 in which the strips are arranged in a repetitively alternating order.

In the example, the printed image 421 is made of three base images 422 that are arranged into strips, and the printed image 421 is also arranged into strips, which stripes are the base images' 422 strips, arranged together in the repetitively alternating order.

Thus, in the example, the printed image's 421 topmost strip is the first base image's 422 topmost strip, the printed image's second topmost strip is the second base image's 422 topmost strip, the printed image's 421 third topmost trip is the third base image's 422 topmost strip.

The pattern continues in a repetitively alternating order, thus the printed image's 421 fourth topmost strip is the first base image's 422 second topmost strip, the printed image's 421 fifth topmost strip is the second base image's 422 second topmost strip, and so on.

The printed image 421 is combined with an array of thin lenses 430, say by printing the image 421 on the flat, backside of the array of lenses 430, or rather, by printing the image on a piece of plastic or other substrate and laminating the printed substrate to the array of lenses 430, to create the lenticular marker 410.

The lenses 430 are aligned with the interlaces (i.e. strips) of the printed image 421, so that light reflected off each strip is refracted in a slightly different direction, but the light from all strips that originate from the same base image 422 are reflected in the same direction.

The lenses 430 and printed image 421 are thus arranged such that when the printed image 421 is viewed through the array of lenses 430, a different one of the base images 422 is viewed simply by changing the angle or distance from which the printed 421 image is viewed.

Thus, a single eye looking at the printed image 421 sees a single whole image, but two eyes see the different, base images 422, which together generate the effect of a change or movement of the lenticular marker 410.

The change or movement may allow a determination of the vehicle's positional data, as described in further detail hereinabove.

Reference is now being made again to FIG. 4A.

Optionally, the lenticular marker 410 is embedded in an element 4000 of the environment that autonomous vehicles move in, as described in further detail hereinabove.

The element 4000 may include, but is not limited to: a traffic sign, a road mark, a fence, a street light, a traffic light, a pole, and a road barrier, or any combination thereof, as described in further detail hereinabove.

Optionally, the lenticular marker 410 of the example is based on LentiMarks or on ArrayMarks, as known in the art.

A LentiMark marker or an ArrayMark lenticular marker is created by printing a Moire pattern of a spatial frequency similar, but not identical, to that of an array of lenticular lenses deployed on the printed pattern, such that a phase difference exists between the printed pattern and the lenses, as known in the art. As a result, when viewed from a distance, the lenticular marker looks differently from different viewing angles, which difference in turn, may code for a different position of the vehicle, as described in further detail hereinabove.

One exemplary ArrayMark has been described by Hideyuki Tanaka, for example, in his publication entitled "A Visual Marker for Precise Pose Estimation Based on a Microlens Array", to Hideyuki Tanaka et al., the 21st International Conference on Pattern Recognition (ICPR 2012), Nov. 11-15, 2012. Tsukuba, Japan.

One exemplary ArrayMark has been described by Hideyuki Tanaka in the above mentioned publication of the 21st International Conference on Pattern Recognition (ICPR 2012), is a square mark that as illustrated in FIG. 2 of that publication, includes four reference points positioned in the marker's corners, as known in the art.

However, the ArrayMark described in that publication, also includes a round central area that is a lens area in which a two-dimensional Moire pattern is displayed through a microlens array (i.e. an array of small lenses).

As illustrated in FIG. 3 of that publication, the pattern of the exemplary ArrayMark includes a plurality of crisscrosses that are printed on the back of the mirelens array.

The layout of the crisscrosses is similar but of a slightly smaller distance between adjacent crisscrosses (compared with the distance between the centers of adjacent lenses of the array), and thus slightly different than the layout of the lenses.

Specifically, as illustrated in that publication's FIG. 4, in the layout of the examplart ArrayMark, one of the lenses is chosen as a "central" lens, even though the chosen lens is not necessarily positioned at the center of the microlens array.

In the "central" lens, a crisscross is printed directly under the lens. However, due to the slightly smaller distance between adjacent crisscrosses, the phase difference between a lens and a crisscross gets larger as the distance between the lens and the chosen "central" lens gets larger.

Figure 5:
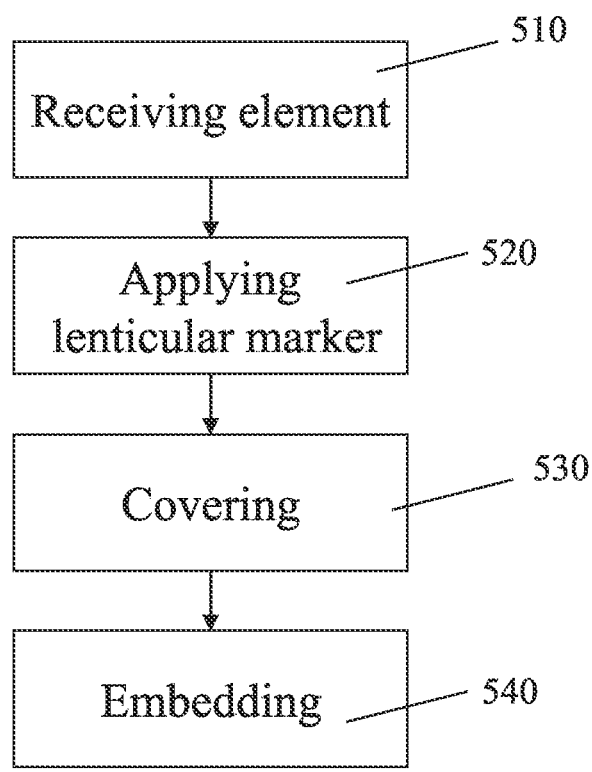
FIG. 5 is a simplified flowchart illustrating an exemplary method of manufacturing an element of an environment of autonomous vehicle movement, according to an exemplary embodiment of the present invention.

As a result, each lens magnifies a different part of a crisscross, and a pattern of movement of a crisscross is viewed, when shifting between viewing angles and/or distances, in front of the marker, as illustrated in that publication's FIGS. 5 and 6.

Positional data of a vehicle from which an image of the lenticular marker that is based on the exemplary ArrayMark, may this by determined using the exemplary ArrayMark, as described by that publication and as illustrated in that publication's FIG. 7-11, or through similar trigonometric or stereometric calculations, as known in the art.

LentiMarkers and their use for determining positional data also have been described by Hideyuki Tanaka, for example, in his publication entitled "Ultra-High-Accuracy Visual Marker for Indoor Precise Positioning", the 2020 IEEE International Conference on Robotics and Automation (ICR), 31 May-31 Aug. 2020, Paris, France.

Optionally, the lenticular marker 410 of the example is rather based on one or more of the lenticular images described by Dr. Itzhak Weissman in his book entitled "Lenticular Imaging: Theory and Practice", published by Pop3dart, on Jan. 1, 2018.

The lenticular marker 410 of the example is covered with a layer 420 that is opaque to human-visible light but is, at least partially, transparent to human invisible light, say a marker opaque to human-visible light but transparent to NIR light or transparent to SWIR light, as described in further detail hereinabove.

Thus, in one exemplary case, the layer 420 that covers the lenticular marker 410 is opaque to human-visible light but is at least partially, transparent to NIR light in the 700-1000 nanometer wavelength range.

In a second exemplary, the layer 420 that covers the lenticular marker 410 is opaque to human-visible light but is at least partially, transparent to SWIR light in the 1000-3000 nanometer wavelength range.

With the layer 420 that is opaque to human-visible light, the environment element 4000 may bear the lenticular marker 410 usable for determining positional data of the autonomous vehicle, while potentially, remaining compliant with regulatory standards of signage and road marking.

Further, with the layer 420 that is opaque to human-visible light, there may be avoided a diversion of driver attention to the markers applied to the traffic sign or other element.

Exemplary embodiments of the present invention thus use a human-imperceptible but vehicle-perceptible marker that is embedded in an element of an environment the vehicle is moving in.

Additionally or alternatively, the lenticular marker 410 covered with the layer 420 that is opaque to human-visible light but is, at least partially, transparent to human invisible light, may be embedded in an element of the vehicle itself (say in the vehicle's registration plate, trunk door, etc.).

The lenticular markers may thus also be used in road tolling, V2X (Vehicle to Everything) or V2V (Vehicle to Vehicle) applications, without effecting the vehicle's human-visible light appearance.

Reference is now made to FIG. 5 which is a simplified flowchart illustrating an exemplary method of manufacturing an element of an environment of autonomous vehicle movement, according to an exemplary embodiment of the present invention.

In an exemplary method of manufacturing an element of an environment of autonomous vehicle movement, according to an exemplary embodiment of the present invention, there is received 510 an element of an environment of vehicle movement, as described in further detail hereinabove.

The element may be received 510, for example, from a manufacturer of the element or other supplier, from a warehouse of a manufacturer that implements the exemplary method of manufacturing, etc.

In one example, the element is manufactured by a party implementing the instant exemplary method manufacturing steps that precede the element's receipt 510, say by assembling parts of the element (say a traffic light or a fence), manufacturing parts of the element, processing metals that the element is made of, etc., as known in the art.

The received 510 element may include, but is not limited to: a traffic sign, a road mark, a fence, a street light, a traffic light, a pole, a road barrier, another element, or any combination thereof.

Next, there is applied 520 a lenticular marker onto a substrate (say a piece of paper, a piece of plastic, or a flat side of an array of lenticular lenses, as described in further detail hereinabove). The marker has a pattern usable for determining positional data of a vehicle moving in the environment, as described in further detail hereinabove.

Optionally, the method further includes one or more steps of manufacturing the lenticular marker itself.

For example, the method may include a step of printing an image that combines two or more base images onto a substrate, say on a piece of paper, a plastic sheet, or another substrate, as described in further detail hereinabove.

Optionally, each base image that the printed image combines, is arranged into a plurality of strips, and the strips are printed and interlaced with one or more similarly arranged base images' strips, to create the printed image, in which printed image, the strips are arranged in a repetitively alternating order, as described in further detail and illustrated using FIG. 4B hereinabove.

In one example, the printed image is made of three base images that are arranged into strips, and the printed image is also arranged into strips, which stripes are the base images' strips, arranged together in the repetitively alternating order, as described in further detail hereinabove.

Optionally, the method further includes a step of combining the printed image with an array of thin lenses, say by the above-described printing of the image being on a flat, backside of the array of lenses, or rather, by laminating the image printed onto a piece of plastic or other substrate to the array of lenses, as described in further detail hereinabove.

In the step, the lenses are further aligned with the interlaces (i.e. strips) of the printed image, so that light reflected off each strip is refracted in a slightly different direction, but the light from all strips that originate from the same base image are reflected in the same direction, as described in further detail hereinabove.

The lenses and printed image are thus arranged such that when the printed image is viewed through the array of lenses, a different one of the base images is viewed simply by changing the angle or distance from which the printed image is viewed.

Thus, a single eye looking at the printed image sees a single whole image, but two eyes see the different base images, which together generate the effect of a change or movement of the lenticular marker.

The change or movement may allow a determination of the vehicle's positional data, as described in further detail hereinabove.

Further in the method, the substrate that the lenticular marker is applied 520 to, is covered 530 with a layer that is opaque to human-visible light but is at least partially transparent to human invisible light, thus covering the lenticular marker with the layer, as described in further detail hereinabove.

In one example, the substrate (and hence, the lenticular marker) is covered 530 with a layer that is opaque to human-visible light but is, at least partially, transparent to NIR light, say to light in the 700-1000 nanometer wavelength range, as described in further detail hereinabove.

In a second example, the substrate (and hence, the lenticular marker) is covered 530 with a layer that is opaque to human-visible light but is, at least partially, transparent to SWIR light, say to light in the 1000-3000 nanometer wavelength range, as described in further detail hereinabove.

The exemplary method of manufacturing, further includes embedding 540 the substrate into the received 510 element, say by laminating the substrate bearing the lenticular mark to the received 510 or attaching the substrate onto a surface of the element in a different way.

The received 510 element may include, but is not limited to any element intended to be deployed in an environment that autonomous vehicles move in—say a traffic sign, a road mark, a fence, a street light, a traffic light, a pole, a road barrier, etc., as described in further detail hereinbelow.

Optionally, the substrate is embedded 540 into the received 510 element after the substrate is covered 530 by the layer that is opaque to human-visible light but is at least partially transparent to human invisible light.

Alternatively, the embedding 540 is carried out before the substrate is covered 530 by the layer, and the covering 530 of the substrate with the layer that is opaque to human-visible light but is at least partially transparent to human invisible light, is carried out after the substrate is already embedded 540 into the received 510 element.

Optionally, the lenticular marker is based on LentiMarks or on ArrayMarks, as described in further detail hereinabove.

LentiMarkers have been described by Hideyuki Tanaka, for example, in his publication entitled "Ultra-High-Accuracy Visual Marker for Indoor Precise Positioning", the 2020 IEEE International Conference on Robotics and Automation (ICR), 31 May-31 Aug. 2020, Paris, France.

A LentiMark marker or an ArrayMark lenticular marker is created by printing a Moire pattern of a spatial frequency similar, but not identical, to that of an array of lenticular lenses deployed on the printed pattern, such that a phase difference exists between the printed pattern and the lenses, as known in the art. As a result, when viewed from a distance, the lenticular marker looks differently from different viewing angles, which difference in turn, may code for a different position of the vehicle, as described in further detail hereinabove.

With the layer that is opaque to human-visible light, the environment element may bear the lenticular marker usable for determining positional data of the autonomous vehicle, while potentially, remaining compliant with regulatory standards of signage and road marking.

Further with the layer that is opaque to human-visible light, there may be avoided a diversion of driver attention to the markers applied to the traffic sign or other element.

Optionally, the lenticular marker covered 530 with the layer that is opaque to human-visible light but is, at least partially, transparent to human invisible light, may be embedded in an element of the vehicle itself (say in the vehicle's registration plate, trunk door, etc.).

The lenticular markers may thus also be used in road tolling, V2X (Vehicle to Everything) or V2V (Vehicle to Vehicle) applications, without effecting the vehicle's human-visible light appearance.

It is expected that during the life of this patent many relevant devices and systems will be developed and the scope of the terms herein, particularly of the terms "Lenticular", "Computer", "Computer Processor", "Micro SD", "CD-ROM", "USB-Memory", "HDD", "SSD", "ROM", "DRAM" "RAM", "Camera", "Autonomous", and "Vehicle", is intended to include all such new technologies a priori.

It is appreciated that certain features of the invention, which are, for clarity, described in the context of separate embodiments, may also be provided in combination in a single embodiment.

Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

In addition, citation or identification of any reference in this application shall not be construed as an admission that such reference is available as prior art to the present invention.

What is claimed is:

1. A method of autonomous vehicle control, the method comprising:

receiving an image of a lenticular human-imperceptible marker covered by a layer opaque to human-visible light and embedded in an element of an environment that an autonomous vehicle is moving in, wherein the opaque layer covers an entire area of a lens array of said lenticular human-imperceptible marker, wherein the marker having a pattern usable for determining positional data of the moving vehicle, the image captured using human-invisible light and wherein said image is based on a plurality of different base images, each one of the plurality of base images is arranged into a plurality of strips, indexed by line indexes such that each strip corresponds to a sequence of one or more of the lines, said pattern is made of a plurality of strips of repetitively alternating order of the plurality of base images, such that from each different viewing angle of said lenticular human-imperceptible marker a different one of the plurality of different base images is viewed;

analyzing the received image of the human-imperceptible marker; and controlling the autonomous vehicle based on the analyzed image of the human-imperceptible marker.

2. The method of claim 1, wherein said analyzing comprises determining at least one of the group consisting of a location of the vehicle, a velocity of the vehicle, and an attitude of the vehicle.

3. The method of claim 1, further comprising: capturing the image of the human-imperceptible marker embedded in the element of the environment, using human-invisible light.

4. The method of claim 1, wherein the layer opaque to human-visible light is at least partially transparent to human invisible light.

5. The method of claim 1, wherein the layer opaque to human-visible light is at least partially transparent to Near Infrared (NIR) light.

6. The method of claim 1, wherein the layer opaque to human-visible light is at least partially transparent to light in the 700-1000 nanometer wavelength range.

7. The method of claim 1, wherein the layer opaque to human-visible light is at least partially transparent to Shortwave Infrared (SWIR) light.

8. The method of claim 1, wherein the layer opaque to human-visible light is at least partially transparent to light in the 1000-3000 nanometer wavelength range.

9. The method of claim 1, wherein the human-imperceptible marker is embedded in at least one of the group consisting of: a traffic sign, a road mark, a fence, a street light, a traffic light, a pole, and a road barrier.

10. A system for autonomous vehicle control, the system comprising:

a processing circuitry; and a memory in communication with said processing circuitry, the memory containing instructions that, when executed by the processing circuitry, cause the system to:

receive an image of a lenticular human-imperceptible marker covered by a layer opaque to human-visible light and embedded in an element of an environment that an autonomous vehicle is moving in, wherein the opaque layer covers an entire area of a lens array of said lenticular human-imperceptible marker, wherein the marker having a pattern usable for determining positional data of the moving vehicle, the image captured using human-invisible light and wherein said image is based on a plurality of different base images, each one of the plurality of base images is arranged into a plurality of strips, indexed by line indexes such that each strip corresponds to a sequence of one or more of the lines, said pattern is made of a plurality of strips of repetitively alternating order of the plurality of base images, such that from each different viewing angle of said lenticular human-imperceptible marker a different one of the plurality of different base images is viewed;

analyze the received image of the human-imperceptible marker; and control the autonomous vehicle based on the analyzed image of the human-imperceptible marker.

11. The system of claim 10, further comprising: an image capturing device in communication with said processing circuitry, configured to capture the image of the human-imperceptible marker embedded in the element of the environment, using human-invisible light.

12. The system of claim 10, further comprising: an image capturing device in communication with said processing circuitry, configured to capture the image of the human-imperceptible marker embedded in the element of the environment, using Near-Infrared (NIR) light.

13. The system of claim 10, further comprising: an image capturing device in communication with said processing circuitry, configured to capture the image of the human-imperceptible marker embedded in the element of the environment, using light in the 700-1000 nanometer wavelength range.

14. The system of claim 10, further comprising: an image capturing device in communication with said processing circuitry, configured to capture the image of the human-imperceptible marker embedded in the element of the environment, using Shortwave Infrared (SWIR) light.

15. The system of claim 10, further comprising: an image capturing device in communication with said processing circuitry, configured to capture the image of the human-imperceptible marker embedded in the element of the environment, using light in the 1000-3000 nanometer wavelength range.

16. An element of an environment of autonomous vehicle movement, comprising:

a lenticular marker covered by a layer opaque to human-visible light but at least partially transparent to human invisible light, wherein the opaque layer covers an entire area of a lens array of said lenticular marker, wherein the marker having a pattern usable for determining positional data of a vehicle moving in the environment and wherein said marker is based on a plurality of different base images, each one of the plurality of base images is arranged into a plurality of strips, indexed by line indexes such that each strip corresponds to a sequence of one or more of the lines, said pattern is made of a plurality of strips of repetitively alternating order of the plurality of base images, such that from each different viewing angle of said lenticular human-imperceptible marker a different one of the plurality of different base images is viewed.

17. The element of claim 16, wherein said layer is opaque to human-visible light but at least partially transparent to at least one of Near Infrared (NIR) light and Shortwave Infrared (SWIR) light.

18. The element of claim 16, wherein said layer is opaque to human-visible light but at least partially transparent to light in the 700-1000 nanometer wavelength range.

19. The element of claim 16, wherein said layer is opaque to human-visible light but at least partially transparent to light in the 1000-3000 nanometer wavelength range.

20. The element of claim 16, wherein the element is at least one of the group consisting of: a traffic sign, a road mark, a fence, a street light, a traffic light, a pole, and a road barrier.

21. The method of claim 1, wherein said layer covering said lenticular human-imperceptible marker has a curvature that matches a curvature of said lens array of said lenticular human-imperceptible marker.

* * * * *